US009853453B2

(12) United States Patent
Nielsen

(10) Patent No.: US 9,853,453 B2
(45) Date of Patent: Dec. 26, 2017

(54) WIND PARK CONTROL SYSTEM

(75) Inventor: Kaj Skov Nielsen, Issaquah, WA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1181 days.

(21) Appl. No.: 13/451,664

(22) Filed: Apr. 20, 2012

(65) Prior Publication Data

US 2013/0277969 A1   Oct. 24, 2013

(51) Int. Cl.
*H02P 9/04* (2006.01)
*H02J 3/38* (2006.01)
*F03D 7/04* (2006.01)
*H02P 101/15* (2016.01)

(52) U.S. Cl.
CPC .............. *H02J 3/386* (2013.01); *F03D 7/048* (2013.01); *H02P 2101/15* (2015.01); *Y02E 10/723* (2013.01); *Y02E 10/763* (2013.01)

(58) Field of Classification Search
CPC ...... H02J 3/386; F03D 7/048; H02P 2101/15; Y02E 10/723; Y02E 10/763
USPC ....................................................... 700/287
See application file for complete search history.

(56) References Cited

U.S. PATENT DOCUMENTS

| | | | |
|---|---|---|---|
| 7,256,508 B2* | 8/2007 | Altemark | F03D 9/003 290/44 |
| 2002/0029097 A1* | 3/2002 | Pionzio et al. | 700/286 |
| 2004/0230377 A1* | 11/2004 | Ghosh et al. | 702/3 |
| 2006/0056285 A1* | 3/2006 | Krajewski, III | G05B 9/03 370/216 |
| 2009/0206841 A1* | 8/2009 | Weng | 324/426 |
| 2009/0212566 A1* | 8/2009 | Harms et al. | 290/44 |
| 2011/0106325 A1* | 5/2011 | Opina et al. | 700/287 |
| 2012/0166000 A1* | 6/2012 | Ellena et al. | 700/287 |
| 2012/0290104 A1* | 11/2012 | Holt et al. | 700/29 |
| 2013/0144449 A1* | 6/2013 | Dalsgaard et al. | 700/287 |

* cited by examiner

*Primary Examiner* — Carlos Ortiz Rodriguez

(57) ABSTRACT

A wind park control system for controlling wind turbines of a wind park during a plant controller handover is provided. A plurality of plant controllers compute control values on the basis of system input data, which plant controllers are realized to operate in parallel. One of the plant controllers operates as an active plant controller for computing control values for controlling the wind turbines. One further plant controller operates as a standby plant controller. An output means continually issues control values to the wind turbines of the wind park. A handover arrangement for handing over control from the hitherto active plant controller to an operative standby plant controller is provided such that that standby plant controller then assumes the function of active plant controller. Further, a wind park, a method of controlling a wind park, and a method of performing a plant controller handover in a wind park are provided.

13 Claims, 4 Drawing Sheets

WIND PARK CONTROL SYSTEM

FIELD OF INVENTION

A wind park control system, a method of controlling a wind park, a wind park, and a method of performing a plant controller handover in a wind park are provided.

BACKGROUND OF INVENTION

Wind parks, which can comprise many tens of wind turbines that all feed their output into a utility grid, are generally controlled or managed by a plant controller, often referred to as a "park pilot". The plant controller issues references or setpoints to the wind turbines of the wind Park according to the momentary requirements of the utility grid. A reference or setpoint for a wind turbine effectively controls or regulates its output. A plant controller generally comprises software running on hardware. The hardware can occasionally require replacement, for example on account of a failure. Software, on the other hand, can require updating on a more frequent basis. Reasons for updating the software might be that an error may become apparent only after a while, and such an error must be corrected. Also, software may be vulnerable to deliberate attacks such as the introduction of malware into the system. Another reason for updating software is that, over time, it may become outdated. In order to replace software that is already running in a prior art plant controller, it is necessary to halt the system while the new software is being installed. It takes time to halt a system, carry out the necessary work, and re-boot the system.

During this time, the wind turbines may be shut down, or they may be allowed to run using the previous, no longer valid, setpoints until the maintenance work has been completed. Evidently, during this time, the output of the wind park may well fail to satisfy grid code requirements. However, grid code requirements are usually very strict. These may stipulate that the output of a wind park feeding into that grid may not be interrupted, or may only be interrupted for a very brief duration, for example a few minutes at most. An "interruption" means any disabling of ancillary controls such as voltage control, frequency control or ramp control while the wind park is generating output power. Failure to meet these requirements can be associated with severe sanctions. For this reason, an operator of a wind park may be compelled to defer such updates or maintenance work. However, some defects cannot be deferred, for example a system failure on account of an error or a malware attack can occur at any unpredictable time. The ensuing unexpected downtime can result in significant loss of revenue for the operator of the wind park.

SUMMARY OF INVENTION

An improved way of operating a wind park to overcome the problems outlined above is provided.

The wind park control system for controlling wind turbines of a wind park, during a plant controller handover, comprises a plurality of plant controllers for computing control values for the wind turbines on the basis of system input data, which plant controllers are realized to operate in parallel, and wherein only one of the plant controllers operates as an active plant controller for computing control values for controlling the wind turbines, while at least one other plant controller operates as a standby plant controller; an output means realized to continually issue control values to the wind turbines of the wind park; and a handover arrangement for handing over control from the hitherto active plant controller to an operative standby plant controller such that that standby plant controller then assumes the function of active plant controller.

Here, the term "control value" in the context of wind turbine control is to be understood as a reference, for example a voltage reference etc., or a setpoint used by a turbine controller to regulate the power output of the wind turbine. Therefore, the terms "control value", "reference value" and "setpoint" may be used interchangeably in the following.

An advantage of the wind park control system is that essentially uninterrupted control of the wind turbines of the wind park is possible essentially at all times, whether during a planned maintenance procedure or during an unexpected failure of the hitherto active plant controller. During the time required to perform the handover, the wind turbines are continually regulated locally, based on recent valid control values. Therefore, there is no need to shut down the wind turbines for the duration of the handover, and these can operate essentially without interruption using up-to-date setpoints, so that the grid code requirements will not be violated. The wind park operator can therefore carry out maintenance work to the hardware and/or software of the active plant controller essentially at any time, whenever such work is convenient or necessary.

The method of controlling a wind park comprises operating one of a plurality of plant controllers as an active plant controller for computing control values on the basis of system input data; operating at least one other plant controller in parallel as a standby plant controller for computing control values on the basis of the system input data; handing over control from the hitherto active plant controller to an operative standby plant controller such that that standby plant controller then assumes the function of active plant controller; and issuing the control values of the current active plant controller to the wind turbines of the wind park. Here, the term "operative plant controller" is to be understood as a plant controller that is generating output setpoints on the basis of input values, whether or not these setpoints are actually issued to wind turbines.

The wind park comprises a plurality of wind turbines and at least one wind park control system.

An advantage of the wind park is that it can continually, i.e. essentially without interruption, feed power into a utility grid, and can therefore continually comply with ancillary service requirements like frequency control, voltage control etc., so that the operator of such a wind park need not be concerned with the possibility of sanctions arising whenever updates or maintenance work should become necessary.

The method of performing a plant controller handover in a wind park comprises the steps of choosing or selecting a suitable operative standby plant controller to assume the function of operative plant controller; obtaining a set of transition control values; assigning the function of active plant controller to the chosen standby plant controller and de-assigning this function from the hitherto active plant controller, whereby, during the handover, the transition control values are issued to the wind turbines of the wind park.

An advantage of the handover method is that it can be carried out in a smooth, controlled manner, so that the wind turbines of the wind park continue to operate without any noticeable "glitch" in output, and the grid requirements can therefore be uninterruptedly met.

Particularly advantageous embodiments and features are given by the dependent claims, as revealed in the following description. Features of different claim categories may be combined as appropriate to give further embodiments not described herein.

In the following, without restricting in any way, it may be assumed that a plant controller of the wind park is located at a point of common connection, i.e. at a point into which the wind turbines collectively feed their output, whether this point is at a high-voltage side of a substation transformer, or at a low-voltage side. The plant controller can effectively be situated on either side of a substation connecting the utility grid to the wind park.

In the following, the term "plant controller" is to be understood in the usual context as a system comprising hardware and software that responds to input (e.g. desired output levels, control commands etc.) and generates output settings or control values for the wind turbines, for example, setpoints for any or all of the wind turbines of the wind park. A plant controller can be realized as a dedicated "real" entity, i.e. as software running on hardware dedicated to that plant controller, or it can be realized as a "virtual" entity, running as software on, for example, a distributed system.

As indicated above, an update or maintenance procedure can take time, depending on the extent of the work to be carried out. This is not a problem in the system when an operative standby plant controller, which has taken over and is now active plant controller, is known to be reliable. However, in a particularly preferred embodiment, the wind park control system comprises at least two standby plant controllers. For example, there can be one active plant controller and two operative standby plant controllers at any one time. Such an operative standby plant controller, since it is running and can take over at any instant, can be referred to as being in "hot standby".

Of course, such a setup requires more hardware if the plant controllers are realized as real entities. Therefore, in a particularly preferred embodiment of the wind park control system, only one standby plant controller is operative in parallel with the active plant controller, and any remaining standby plant controller is inoperative, which can be referred to as being in "cold standby". For example, one of these standby plant controllers can be designated to take over control should the necessity arise, and is therefore operated in hot standby, i.e. it runs in parallel with the active plant controller. One or more other standby plant controllers are present in "cold standby", i.e. turned off as long as there is an active plant controller running in parallel with a hot standby plant controller. When a handover is taking place, a hitherto cold standby plant controller can be turned on or booted, manually or automatically, so that it starts to function as an operative, hot standby plant controller, thereby effectively "replacing" the hitherto operative standby plant controller, which is now running as the active plant controller.

A plant controller can essentially continuously generate setpoints for one or more wind turbines of a wind park. From the point of view of a wind turbine, the reference values that it receives should not suddenly change. For example, if the output of a wind turbine is to be radically decreased or increased for whatever reason, it should receive setpoints that adjust its operation in a controlled manner. Therefore, in a particularly preferred embodiment, the wind park control system comprises a logging arrangement for logging the reference values computed by an operative plant controller and at least one hot standby plant controller. In this way, the logged reference values of a plant controller can be tracked or monitored during operation of the plant controller to determine any discrepancy that might indicate a problem in that plant controller.

Before handing over control from the currently active or working plant controller to a plant controller on standby, it should be ascertained that the setpoints being issued will not suddenly differ in value compared to the previously issued control values. Therefore, in a particularly preferred embodiment, the wind park control system comprises a comparator for comparing the logged setpoints of two or more operative plant controllers. The comparator is preferably realized to compare the logged setpoints of the active plant controller and an operative standby plant controller and/or to compare the logged setpoints of two operative standby plant controllers. Such a comparator can be used, for example, to investigate whether an operative standby plant controller is indeed computing the same output references on the basis of the same input being used by the active plant controller. If this is the case, that operative standby plant controller would be a legitimate "candidate" to take over from the currently active plant controller. Equally, the comparator can be used to decide which of two or more operative standby plant controllers are generating setpoints closest to those being generated by the active plant controller. A "best match", preferably monitored using comparisons made over a certain duration, can be used as a basis for deciding which of those operative standby plant controllers is best suited to take over from the active plant controller. To this end, the wind park control system preferably comprises a selector unit for choosing, on the basis of the logged setpoints, a suitable operative standby plant controller to assume the function of active plant controller. An operative standby plant controller is therefore essentially always ready to take over from the currently active plant controller, and its "readiness" or suitability is continually monitored by comparing its output reference values with the reference values of the active plant controller.

If a plant controller for some reason starts to malfunction, such a failure will generally manifest as output reference values that are distinctly different from expected values. Therefore, in a particularly preferred embodiment, the wind park control system comprises an analysis unit for analyzing the logged reference values of a number of active plant controllers. Such an analysis unit can be used to process the reference values of a plant controller to determine any expected or allowable statistical mean and to detect any departure from such a mean. The analysis unit can therefore be used to some extent as a diagnostic tool and can provide an indication that a handover is imminent or necessary.

A handover from one plant controller to another will generally involve some time, even if only a few seconds or even a fraction of a second. A controlled handover involves "disconnecting" the old plant controller from the wind turbines and "reconnecting" these to a replacement plant controller. During this time, however brief, the old plant controller is no longer active and is therefore no longer issuing references to the wind turbines of the wind park. For this reason, prior art wind parks necessitated either shutting down the wind park, or allowing the wind turbines to operate in an uncontrolled manner for the duration of the handover, followed by a "jump" or "glitch" in setpoints when a replacement plant controller took over plant control, issuing setpoints different from the setpoints last issued by the old plant controller. As mentioned in the introduction, such interruptions can result in grid non-compliance and can be severely sanctioned. Therefore, in a particularly preferred embodiment, the wind park control system is realized to issue transition control values to the wind turbines of the wind park during a handover from the hitherto active plant controller to the operative standby plant controller, wherein a transition control value is derived from a control value issued by the hitherto active plant controller and/or from a control value returned by a wind turbine. The transition setpoints can be obtained in any suitable manner. For example, for a wind park in which the wind turbines are connected to the plant controller over a network, the up-to-date setpoints most recently used by some or all of the wind turbines can be provided to the point of common connection. These most recent setpoints can be re-issued as "transition setpoints" during the brief time in which the hitherto hot-standby plant controller is taking over from the previously active plant controller and/or for initialization of the hitherto hot-standby plant controller in readiness for a handover procedure, as will be explained below. In this way, in contrast to the prior art systems, the wind park control system allows an essentially uninterrupted and smooth handover without any significant or noticeable down-time.

Preferably, the system is realized such that the handover—whether manual or automatic—is completed within at most 5 seconds, more preferably within at most 2.5 seconds, most preferably within at most 100 milliseconds. Preferably, the system is realized such that a manual handover is completed within at most 5 seconds and/or such that an at least partially automated handover is complete within at most 1.0 second. During this handover time, the wind turbines can run using the transition setpoints while the hitherto standby plant controller is assuming its function as active plant controller. The "handover time" can be understood to be the time between the instant at which the "old" active plant controller ceases to issue setpoints to the wind turbines and the instant at which the "new" active plant controller commences issuing setpoints directly to the wind turbines.

Since it is very desirable to ensure that the wind turbines are, as far as possible, unaffected by the handover, the setpoints that are issued after handover should preferably match those of the hitherto or previously active plant controller as closely as possible. Therefore, in a particularly preferred embodiment, the step of handing over control is based on a comparison of logged reference values of the active plant controller and logged reference values of an operative standby plant controller. For example, if there are two of these in "hot standby" mode, it may be that the setpoints of one hot standby controller match those of the active plant controller more closely than the setpoints of the other hot standby controller. In that case, the hot standby controller with the "better" setpoints would be chosen to take over from the active plant controller.

Therefore, in a particularly preferred embodiment, the method of controlling a wind park comprises the step of initializing the suitable or chosen operative standby plant controller on the basis of control values collected from one or more wind turbines of the wind park. For example, for a wind park in which the wind turbines and park pilot are connected over a network such as a LAN, the wind turbines can receive their control values, references or setpoints from the park controller over the LAN, and can also return or deliver their setpoints to a standby park controller. To this end, a hot standby plant controller can receive or collect references from all turbines allocated to it. These collected references can be used to initialize the standby plant controller in order to ensure a smooth transition during a handover procedure. The step of collecting references from the turbines allocated to a plant controller can commence as soon as a handover procedure is initiated, or can be continually performed, so that the wind park control system is always prepared for any failure of the active plant controller.

A wind turbine can only receive setpoints from one plant controller, but setpoints could be generated by two plant controllers—"active" and "hot standby"—during handover. Therefore, in a particularly preferred embodiment, the handover arrangement is configured such that a wind turbine of the wind park is controllable by at most one plant controller at any one instant. A mechanism or means for ensuring that only one plant controller actually transmits references to the turbines can comprise a virtual multiplexer realized to select one reference source—i.e. one operational plant controller—from among all of the available operational plant controllers, or it can comprise an exclusive transmission enable function that ensures that, of all available operational plant controllers generating valid references, only one operation plant controller is granted permission to transmit its references to the turbines at any given time. In this way, a "collision" of setpoints can be avoided.

The handover method can be realized also as a computer program product for carrying out the steps of the method when the computer program product is loaded into a memory of a programmable device of a plant controller. For example, in response to an input from an operator or an automatically generated emergency signal, a handover algorithm can deactivate the current active plant controller, select and activate the most suitable standby plant controller, and enable distribution of references from the new active plant controller to the wind turbines of the wind park. The handover algorithm can ensure that, during the actual handover procedure, the wind turbines continue to run using the last valid setpoints previously generated by the previously active plant controller during that short transition period. The handover algorithm can also boot up a cold-standby controller to become an operative or back-up hot-standby controller.

Other objects and features will become apparent from the following detailed descriptions considered in conjunction with the accompanying drawings. It is to be understood, however, that the drawings are designed solely for the purposes of illustration and not as a definition of limits.

DETAILED DESCRIPTION OF INVENTION

In the diagrams, like numbers refer to like objects throughout. Objects in the diagrams are not necessarily drawn to scale.

Figure 1:
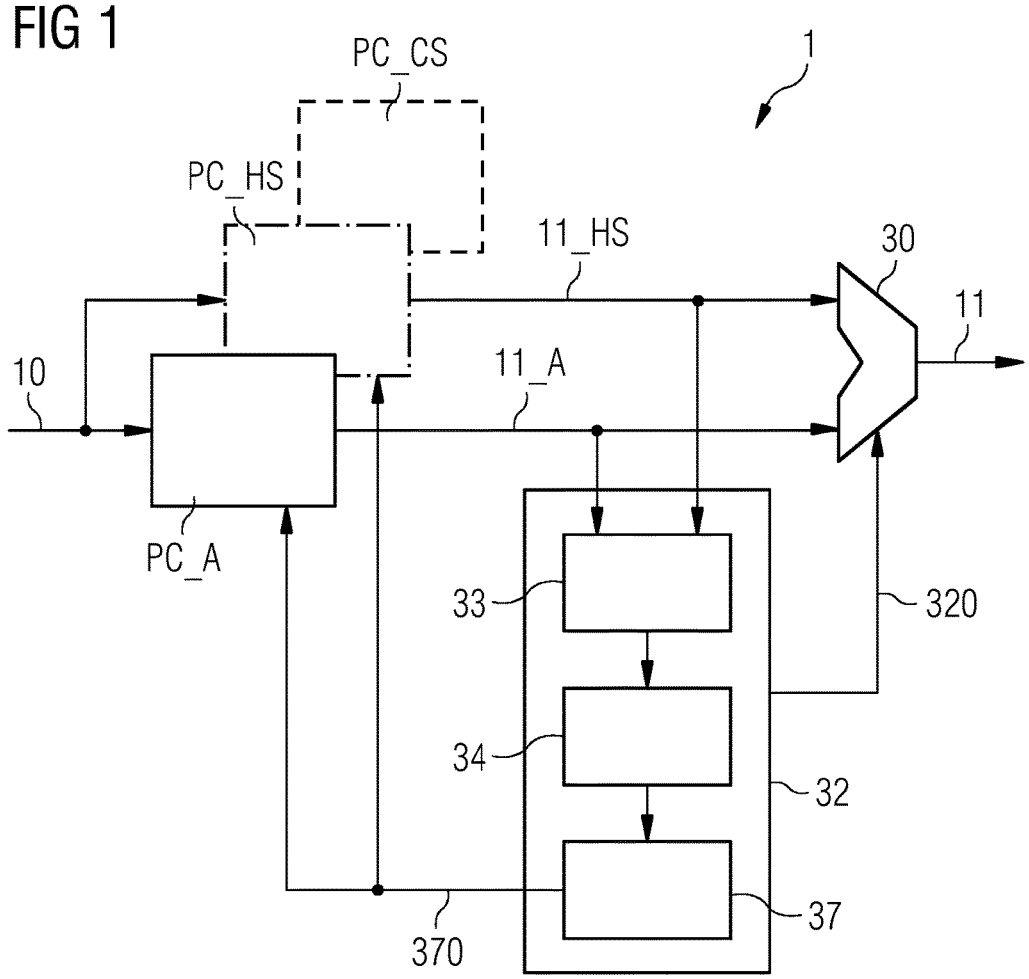
FIG. 1 shows a block diagram of a wind park control system according to a first embodiment.

FIG. 1 shows a block diagram of a wind park control system 1 according to a first embodiment. The functions of these blocks will generally be realized as software modules running on some appropriate hardware.

The system 1 receives input 10 from a utility grid (not shown in the diagram), for example to inform the control system 1 of a required wind park power output. The control system 1 according to this embodiment has three plant controllers PC_A, PC_HS, PC_CS. Only one plant controller PC_A is active, while one plant controller PC_HS is in hot standby, i.e. running in parallel with the active plant controller PC_A, and the remaining plant controller PC_CS is in cold standby, i.e. turned off or dormant.

The system input 10 is given to both active plant controller PC_A and hot standby plant controller PC_HS. These generate reference values 11_A, 11_HS or setpoints 11_A, 11_HS for the wind turbines accordingly. During normal operation, the reference values 11_A of the active plant controller PC_A are simply passed on as setpoints 11 to the wind turbines of the wind park (not shown in the diagram).

The reference values 11_A, 11_HS of the active plant controller PC_A and hot standby plant controller PC_HS are also continually logged in a logging module 32. Here, a comparator 33 can compare the reference values 11_A, 11_HS to see if the hot standby plant controller PC_HS is performing comparably to the active plant controller PC_A. An analysis module 34 can analyze the development of the reference values over time, and a selector unit 37 can indicate whether the operative standby plant controller is performing satisfactorily, so that this unit can effectively provide an "OK" for a planned handover.

As long as the active plant controller PC_A is in control, an output signal 320 of the logging module 32 routes the reference values 11_A of the active plant controller PC_A to the wind turbines of the wind park. This is indicated here by a multiplexer 30, but the selection could of course simply comprise an "if then else" software construct 30 or other suitable switching output means 30.

If a handover is scheduled or becomes necessary, a suitable signal 370 issued by the selector unit 37 can indicate the change of status to the hitherto active and hot-standby plant controllers PC_A, PC_HS, so that the hot-standby plant controller PC_HS assumes the function of active plant controller.

During this brief handover time, the last valid references 11_A transmitted directly before the handover procedure can be re-transmitted as transition setpoints to the wind turbines of the wind park, so that these run on reasonably up-to-date setpoints.

At the same time, the cold-standby plant controller PC_CS can be booted and can assume the function of hot-standby plant controller, from which point in time it should also receive the reference values 10. This may be visualized as a re-arrangement of the "stack" of plant controllers on the left of the diagram, allowing the hitherto hot standby plant controller PC_HS to move to the front of the stack, where it functions as active plant controller PC_A, etc. Of course, more than one hot standby plant controller PC_HS can be present and operative. In that case, the logging module 32 can log and compare reference values of three or more operative plant controllers, and is therefore in a position to detect whether one of those plant controllers is defective, since a significant discrepancy or deviation in the reference values of one plant controller compared to those of the others would indicate that that plant controller is defective and should be repaired or substituted.

Figure 2:
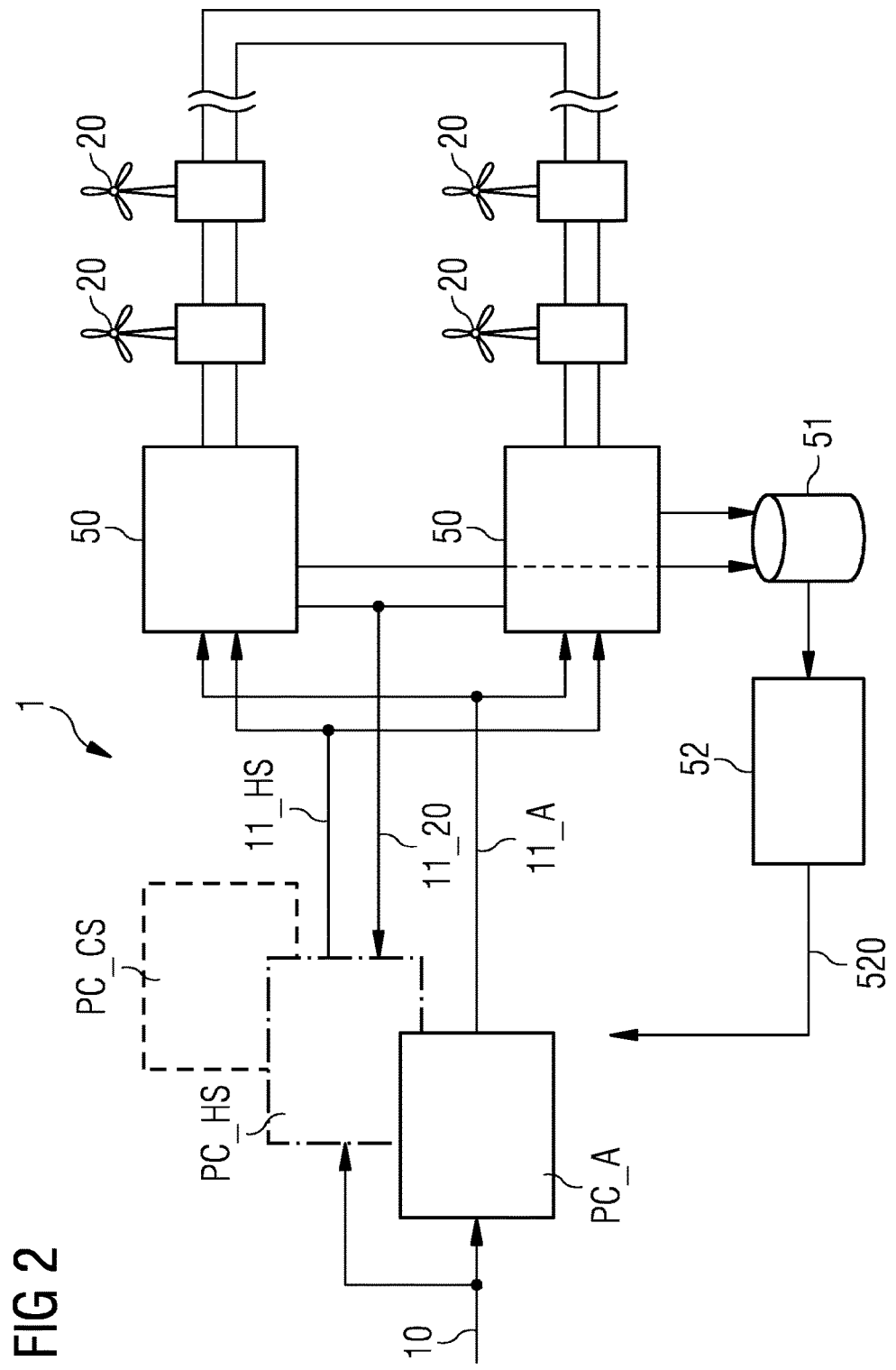
FIG. 2 shows a block diagram of a wind park control system according to a second embodiment.

FIG. 2 shows a block diagram of a wind park control system 1 according to a second embodiment. Again, the system input 10 is given to an active plant controller PC_A and a hot standby plant controller PC_HS. These generate reference values 11_A, 11_HS or setpoints 11_A, 11_HS for the wind turbines accordingly. The active plant controller PC_A and the hot standby plant controller PC_HS both calculate turbine references 11_A, 11_HS and transmit these to a storage device 51 over a redundant wind-park network comprising a set of redundant network switches 50. The storage device 51 logs the calculated references 11_A, 11_HS for comparison and analysis in a logging module 52 or performance comparison unit 52. The performance comparison unit 52 can evaluate whether the plant controllers PC_A, PC_HS are in agreement, and if more than two controllers are operating in hot standby mode, it can identify a "best match". Equally, the performance comparison unit 52 can detect any large deviation of a setpoint 11_A, 11_HS from an average or expected value. The performance comparison unit 52 can generate a reference enable signal 520, which determines which of the plant controllers PC_A, PC_HS is to transmit references to its associated turbines. The reference enable signal 520 will be directed at the appropriate plant controller. Only the setpoints originating from the controller that receives the reference enable signal 520 will be passed through the network switches 50 or output means 50 to the wind turbines 20. Prior to handover, this is the active plant controller PC_A; during and after handover, this is the hot standby plant controller PC_HS. Alternatively, during handover, setpoints 11_20 returned from the wind turbines 20 of the wind park 2 can be received by the standby plant controller PC_HS and re-issued as transition setpoints. Of course, this principle applies equally to the embodiment of FIG. 1.

A communication link connecting the network switches 50 to the turbines 20 can be a simple star network configuration, a redundant ring configuration or any appropriate communication configuration for that turbine arrangement.

The plant controllers PC_A, PC_HS, PC_CS can operate on different types of hardware, on identical hardware, on different operating systems, on different application software or any suitable combination. One plant controller can operate with one version of virus or malware protection, while another might not comprise any such software. Each combination or new configuration can be validated in a "real-life" application before being enabled to actively issue setpoints to the wind power plant.

Figure 3:
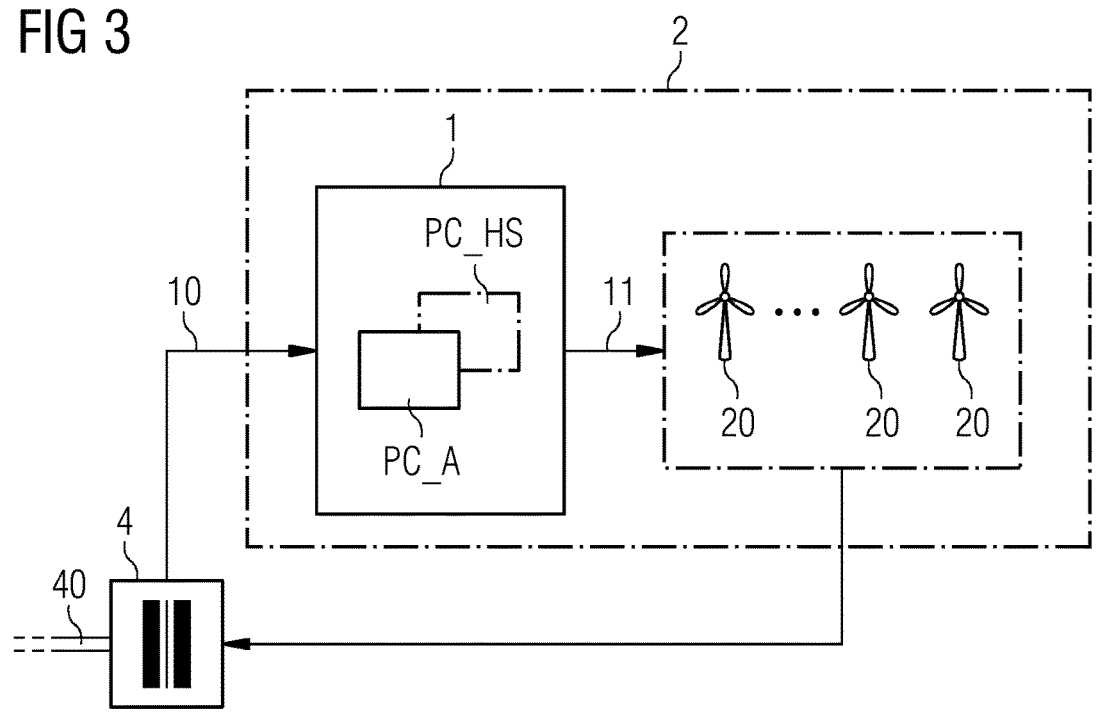
FIG. 3 shows a schematic representation of a wind park according to a first embodiment.

FIG. 3 shows a schematic representation of a wind park 2 according to a first embodiment. Here, the wind park comprises any number of wind turbines 20, as well as a control system 1. Elements of the control system 1 such as logging module, output means etc. can be taken from the previous embodiments. The control system 1 receives commands or requirements as input 10 from a substation 4 that feeds the wind park output into a transmission line 40. In this embodiment, the control system 1 comprises two controllers PC_A, PC_HS of which one plant controller PC_A is active at any one time while the other plant controller PC_HS is in hot standby. Whenever the currently active plant controller PC_A must be taken out of commission for whatever reason, the hot standby plant controller PC_HS can take over in a controlled manner as described above, so that the wind turbines 20 of the wind park 2 continue to provide output in a smooth and uninterrupted manner, and grid code requirements can be met at any time during the controller handover process.

Figure 4:
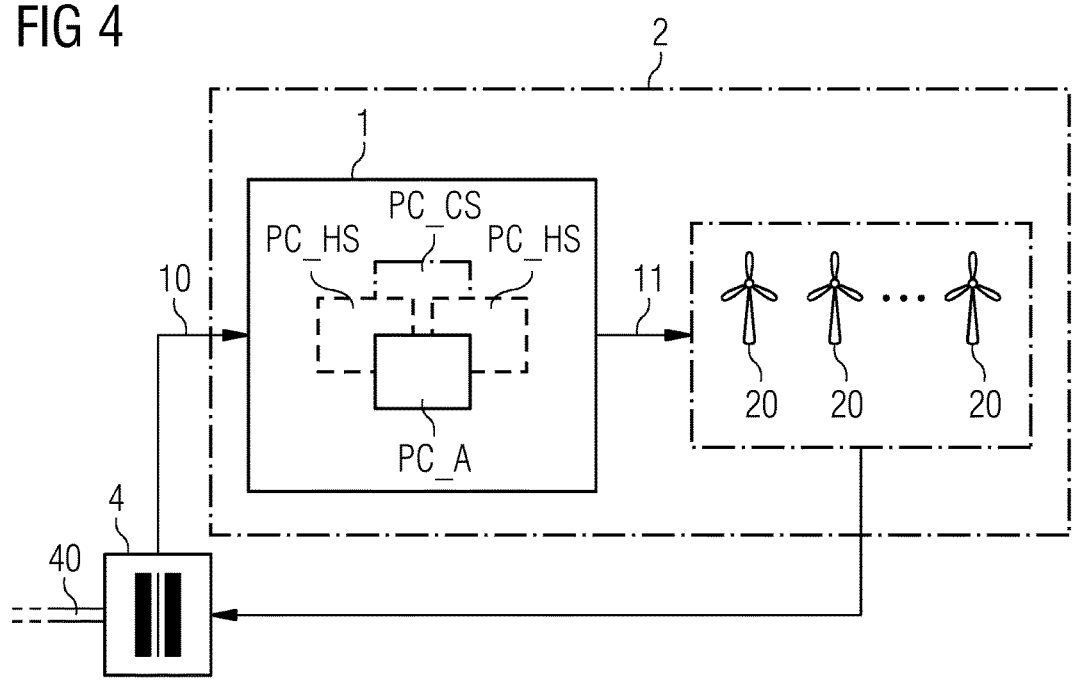
FIG. 4 shows a schematic representation of a wind park according to a second embodiment.

FIG. 4 shows a schematic representation of a wind park 2 according to a second embodiment. In this embodiment, the control system 1 comprises four controllers of which one plant controller PC_A is active at any one time. Here, the control system 1 comprises two hot standby plant controllers PC_HS and a fourth plant controller PC_CS in cold standby. The selector unit in the logging module of this embodiment of the control system 1 can choose which of the two hot standby plant controllers PC_HS is best suited to take over from the active plant controller PC_A, while the analysis unit can detect whether any one of the operative plant controllers PC_A, PC_HS is performing unsatisfactorily for any reason.

Although the present wind park control system has been disclosed in the form of preferred embodiments and variations thereon, it will be understood that numerous additional modifications and variations could be made thereto without departing from the scope.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind park control system for controlling wind turbines of a wind park during a plant controller handover, comprising:
   two or more plant controllers for computing control values based upon system input data, said plant controllers are configured to operate in parallel, and wherein one of the plant controllers operates as an active plant controller for computing control values for controlling the wind turbines, and at least one further plant controller of the plant controllers operates as an operative standby plant controller;
   a logging module for logging the control values computed by the two or more operative plant controller;
   a comparator for comparing the logged control values of the active plant controller and the operative standby plant controller;
   an output means configured to continually issue control values to the wind turbines of the wind park during the plant control handover; and
   a handover arrangement for handing over control from the active plant controller to the operative standby plant controller such that the operative standby plant controller then assumes the function of active plant controller, wherein the handover arrangement is based on the compared logged control values and based on a comparison of logged reference values of the active plant controller and logged reference values of at least one operative standby plant controller;
   wherein the handover arrangement is configured such that the wind turbines of the wind park are controlled by at least one plant controller.

2. The wind park control system according to claim 1, wherein the comparator compares the logged control values of the active plant controller and the operative standby plant controller and/or compares the logged control values of two operative standby plant controllers.

3. The wind park control system according to claim 1, further comprising: a selector unit for choosing, based upon the logged control values, an operative standby plant controller to assume the function of active plant controller.

4. The wind park control system according to claim 1, wherein the system issues transition control values to the wind turbines of the wind park during a handover from an active plant controller to an operative standby plant controller, and
   wherein a transition control value is derived from an up-to-date control value issued by an active plant controller and/or from a control value returned by a wind turbine or multiple wind turbines.

5. The wind park control system according to claim 1, further comprising:
   at least two standby plant controllers.

6. The wind park control system according to claim 5, wherein only one standby plant controller is operative in parallel with an active plant controller, and any remaining standby plant controller is inoperative.

7. A wind park, comprising: a plurality of wind turbines, and at least one wind park control system, comprising:
   two or more plant controllers for computing control values based upon system input data, said plant controllers are configured to operate in parallel, and wherein one of the plant controllers operates as an active plant controller for computing control values for controlling the wind turbines, and at least one further plant controller of the plant controllers operates as an operative standby plant controller;
   a logging module for logging the control values computed by the two or more operative plant controller;
   a comparator for comparing the logged control values of the active plant controller and the operative standby plant controller;
   an output means configured to continually issue control values to the wind turbines of the wind park during the plant control handover; and
   a handover arrangement for handing over control from the active plant controller to the operative standby plant controller such that the operative standby plant controller then assumes the function of active plant controller, wherein the handover arrangement is based on the compared logged control values and based on a comparison of logged reference values of the active plant controller and logged reference values of at least one operative standby plant controller;
   wherein the handover arrangement is configured such that the wind turbines of the wind park are controlled by at least one plant controller.

8. The wind park according to claim 7, wherein a plant controller is realized as a virtual instance.

9. A method of controlling a wind park comprising a plurality of wind turbines, the method comprising:
   operating one of a plurality of plant controllers as an active plant controller for computing control values for controlling the plurality of wind turbines of the wind park based upon system input data;
   operating at least one other plant controller in parallel as an operative standby plant controller for computing control values for controlling the plurality of wind turbines of the wind park based upon the system input data;
   logging the control values from the active plant controller and the at least one operative standby plant controller;
   comparing the logged control values of the active plant controller and the at least one operative standby plant controller to determine a comparable performance;
   based on the comparable performance handing over control from the active plant controller to the operative standby plant controller such that the operative standby plant controller assumes the function of current active plant controller; and
   issuing the control values of the current active plant controller to the plurality of wind turbines of the wind park.

10. The method according to claim 9, further comprising: selecting an operative standby plant controller to assume the function of active plant controller, wherein the selection is based on a comparison of logged control values of an active plant controller and logged control values of an operative standby plant controller.

11. The method according to claim 10, further comprising:
  initializing an operative standby plant controller based upon control values collected from a number of wind turbines of the wind park.

12. A method of performing a plant controller handover in a wind park, comprising:
  providing a plurality of wind turbines,
  providing at least one wind park control system, comprising:
    two or more plant controllers for computing control values based upon system input data, said plant controllers are configured to operate in parallel, and wherein one of the plant controllers operates as an active plant controller for computing control values for controlling the wind turbines, and at least one further plant controller of the plant controllers operates as an operative standby plant controller;
    a logging module for logging the control values computed by the two or more operative plant controller;
    a comparator for comparing the logged control values of the active plant controller and the operative standby plant controller;
    an output means configured to continually issue control values to the wind turbines of the wind park;
    a handover arrangement for handing over control from the active plant controller to the operative standby plant controller such that the operative standby plant controller then assumes the function of active plant controller;
  choosing a suitable operative standby plant controller to assume the function of active plant controller;
  obtaining a set of transition control values;
  assigning the function of active plant controller to the chosen operative standby plant controller and de-assigning this function from the active plant controller, whereby, during the handover, the transition control values are issued as control values to the wind turbines of the wind park;
  wherein the handover arrangement is configured such that the wind turbines of the wind park are controlled by at least one plant controller.

13. The method according to claim 12, wherein a plant controller is realized as a virtual instance.

* * * * *